H. J. MOGENSEN, DEC'D.
L. MOGENSEN, ADMINISTRATRIX.
DISPENSER.
APPLICATION FILED JAN. 9, 1918.
1,355,562.
Patented Oct. 12, 1920.
2 SHEETS—SHEET 1.
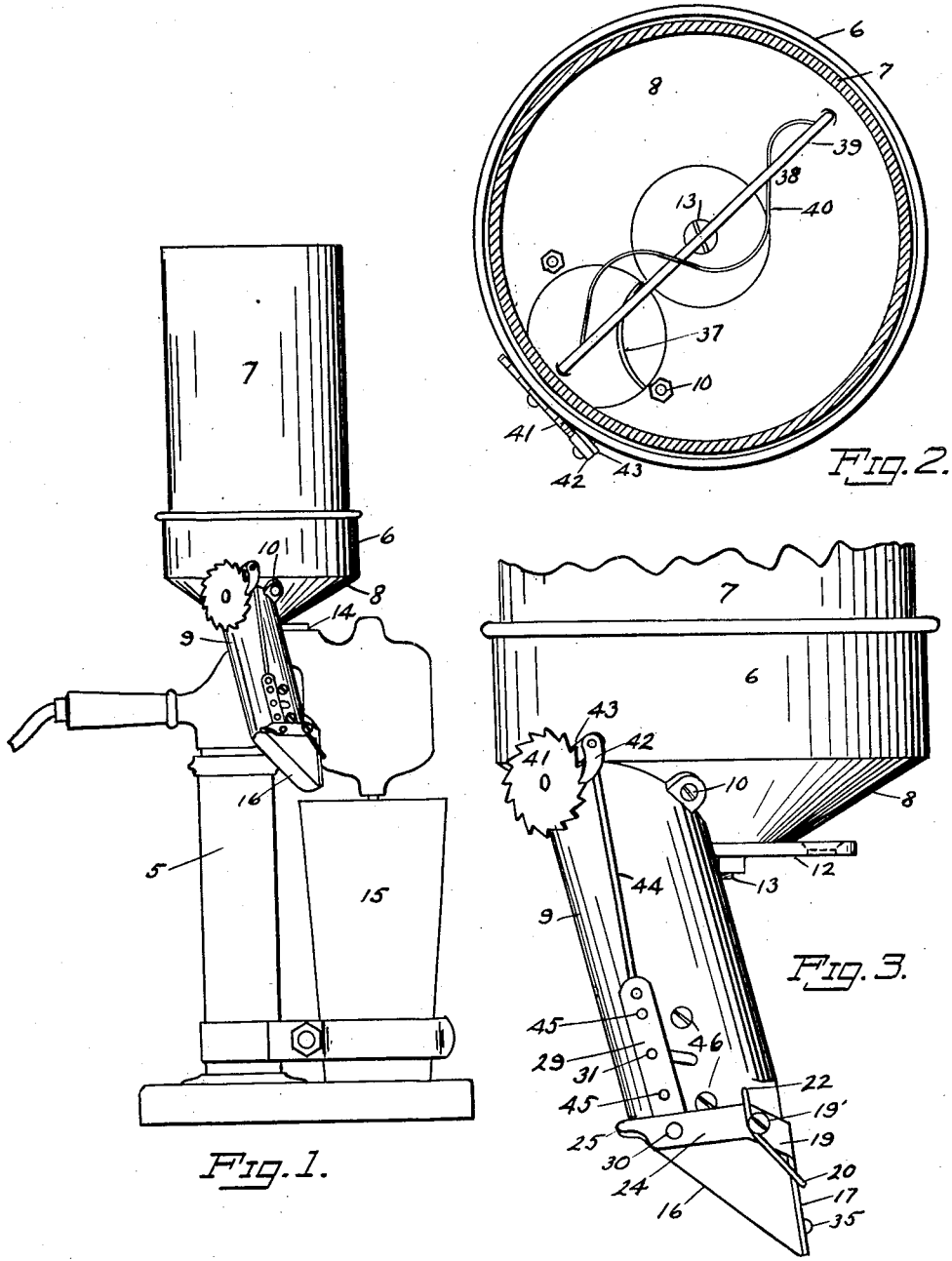
WITNESS
W. Lewis Coop
INVENTOR.
Henry J. Mogensen, deceased,
Lillie Mogensen, Administratrix.
BY
Jno. G. Powell
ATTORNEY.

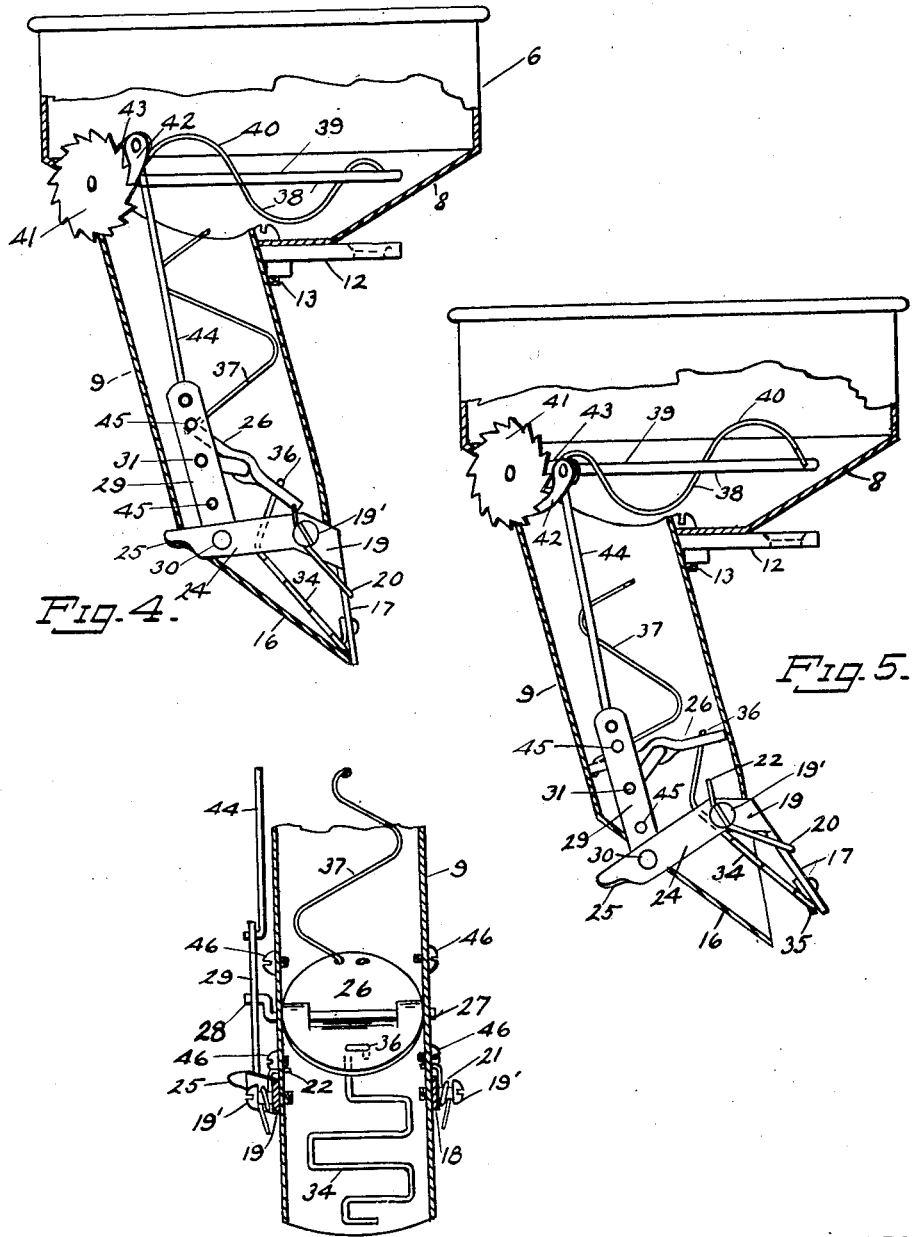

UNITED STATES PATENT OFFICE.

HENRY J. MOGENSEN, DECEASED, LATE OF DENVER, COLORADO, BY LILLIE MOGENSEN, ADMINISTRATRIX, OF DENVER, COLORADO.

DISPENSER.

1,355,562.  Specification of Letters Patent.  Patented Oct. 12, 1920.

Application filed January 9, 1918. Serial No. 211,090.

*To all whom it may concern:*

Be it known that HENRY J. MOGENSEN, deceased, late a citizen of the United States, and a resident of the city and county of Denver and State of Colorado, has invented certain new and useful Improvements in Dispensers, of which the following is a full and exact description, such as will enable others skilled in the art to which the invention appertains to make and use the same.

This invention relates to improvements in dispensers particularly adapted for dispensing malted milk at soda fountains, and any other places where malted milk drinks are mixed.

The object of the invention is to provide a dispenser adapted to be attached to and used in connection with a mixing machine, whereby a suitable quantity of the powdered malted milk may be dispensed into the mixing receptacle when the latter is placed in position to be mixed by the mixing machine.

Another object of the invention is to provide suitable means in conjunction with the dispenser for measuring the powder.

With these and other objects in view, the invention will be described in detail with reference to the accompanying drawings.

In these drawings, Figure 1 is an elevation view of the dispenser in its application to the mixing machine; Fig. 2 is a cross-sectional view of the powder containing receptacle; Fig. 3 is an elevation view of the dispenser; Fig. 4 is a vertical sectional view of the dispenser illustrating the interior of the measuring device; Fig. 5 is also a vertical sectional view of the dispenser, this view showing the closure of the latter in the opened position whereby the powder may be discharged therefrom; and Fig. 6 is a vertical sectional view of the dispensing device.

Corresponding and like parts are referred to in the following description and indicated in all the views of the accompanying drawings by the same reference characters.

Let the numeral 5 designate a drink-mixing machine in its entirety, the same being of the ordinary type of motor operated mixer. The dispenser proper consists of a cup 6 which receives the mouth of a jar 7. This jar 7 is adapted to contain malted milk powder, or other substance which is to be dispensed. The cup 6 is provided with a conical shaped bottom 8, with which a depending conduit 9 communicates. This depending conduit 9 is secured to the conical shaped bottom 8 of the cup 6, as shown at 10. An arm 12 is secured to the conical shaped bottom 8, as shown at 13, by means of which arm, the dispenser is attached to the top of the drink mixing machine, as shown at 14. The conduit 9 is attached to the cup 6 near one edge of the latter, whereby the said conduit will project over the mixing machine and extend to a position immediately above the mixing receptacle 15.

The discharge extremity of the conduit 9 is provided with an inclined wall 16, which inclined wall 16 forms the bottom of the conduit 9 and serves to direct the material through a discharge opening in the side wall of said conduit. This discharge opening in the side wall of the conduit is controlled by means of a closure 17, said closure 17 being provided with ears 18 and 19 on the opposite edges of said closure. These ears 18 and 19 are bent at right angles to the closure 17, and are connected with pivot screws 19'. The said pivot screws 19' being set into the opposite sides of the conduit 9. A U-shaped spring 20 passes over the outer side of the closure 17, the said U-shaped spring 20 being coiled around the pivot screws 19' as shown at 21, and the extremities of said spring are fixedly secured in the opposite sides of the conduit 9, as shown at 22. By reason of this U-shaped spring 20, the closure 17 is normally maintained in its closed position.

A lever portion 24 is integrally formed with the ear 19 of the closure 17 by means of which said lever 24 the closure 17 may be actuated to its opened position against the tension of the spring 20. The outer extremity of this lever 24 is curved into a horizontal part, which said part 25 may be engaged by the finger for actuating said lever 24. A butterfly valve 26 is journaled in the conduit 9 by means of a journal pin 27. One extremity of this journal pin 27 extends through the side of the conduit 9 and is opened into a crank 28, said crank 28 being operatively connected with the lever 24 by means of a member 29. The lower extremity of this member 29 is pivotally connected with the lever 24, as shown at 30, and the crank 28 is received through an opening in the member 29, as shown at 31, whereby when the lever 24 is pressed downwardly for opening the closure 17, the butterfly valve 26 will be actuated to a horizontal position and thereby form a stoppage in the conduit 9. Thus, only such material as is in that portion of the conduit below the butterfly valve 26 will be discharged from the conduit 9 into the mixing receptacle 15. Now, as soon as the lever 24 is released, the spring 20 will actuate the closure 17 to its closed position, and through the action of the lever 24 and the member 29, the butterfly valve 26 will be actuated to the position indicated in Fig. 4, whereby material in the conduit 9 will be permitted to pass into the measuring portion of said conduit below the butterfly valve 9. An agitating member 34 is connected at one extremity with the closure 17, as shown at 35, and at its other extremity with the butterfly valve 26, as shown at 36. This agitating member 34 is formed of a wire, bent in staggered shape, as illustrated in Fig. 6, whereby when the closure 17 is actuated, this agitating member 34 will be caused to move in the measuring portion of the conduit 9 for the purpose of loosening up the material therein so that it may be freely discharged when the closure 17 is opened. An agitating member 37 is carried by the butterfly valve 26 and extends above the latter in the conduit 9, whereby movement of the butterfly valve 26 will actuate said agitating member 37 for causing the material in the conduit 9 above the butterfly valve 26 to be loosened up. This agitating member 37 is formed of wire and is bent into the staggered shape illustrated, so that the desired action upon the material will be accomplished. An agitating member 38 is arranged in the cup 6, said agitating member 38 also serving to feed the material into the conduit 9. This agitator 38 comprises a shaft 39 journaled in the cup 6, said shaft 39 carrying a spiral wire 40, which said spiral wire 40 is rotated with the shaft 39 and accomplishes the action of an ordinary screw conveyer. A ratchet-wheel 41 is fixedly secured to one extremity of the shaft 39 on the exterior of the cup 36. This ratchet-wheel 41 is operatively engaged by means of a pawl 42, which is pivoted upon one extremity of a pawl-carrying member 43. A rod 44 connects this pawl 43 with the upper extremity of the member 29, whereby, when the closure 17 is actuated to the open position, the pawl 42 will actuate the ratchet-wheel 41, and thereby rotate the agitator 38, causing the material in the cup 6 to be conveyed into the conduit 9.

The opposite side walls of the conduit 9 are provided with journaled openings therein at different elevations, whereby the butterfly valve 26 may be adjusted to vary the size of the measuring portion of the conduit 9. These openings are normally plugged up by means of screws 46. By this construction, the butterfly valve 26 may be placed at a higher elevation in the conduit 9, or at a lower elevation in the latter, whereby the capacity of the measuring portion of the conduit may be either increased or decreased as the case may be. The member 29 is also provided with two additional openings 45, one of which said openings will receive the crank 28 when the position of the butterfly valve 26 is changed.

While a specific form of the invention has been herein described, it is understood that the invention is not limited thereto and that the same may be modified and varied without departing from the spirit of the invention or the scope of the appended claims.

Having thus described the invention, what is claimed, is:

1. A dispenser, adapted to be attached to a mixing machine, consisting of a cup, said cup adapted to receive the mouth of a containing receptacle, a conduit connected with the bottom of said cup in a position offset from the center of said cup, said conduit having an opening in its side, the lower extremity of said conduit being inclined to said opening, a closure controlling the discharge extremity of said conduit, a valve journaled in said conduit above the said opening, said closure having an operating lever, a member forming a connection between said operating lever and said valve, and an agitating member connecting said valve with said closure movable toward said opening by the opening movement of the closure.

2. A dispenser, comprising a cup adapted to receive the mouth of a jar, a conduit connected with the bottom of said cup and communicating with the interior of the latter, the lower extremity of said conduit being inclined, the side of said conduit adjacent said inclined lower extremity of the conduit having a discharge opening therein, a closure for said discharge opening, means for normally retaining said closure in its closed position, a valve journaled in said conduit above the discharge extremity of the latter, an operative connection between said valve and said closure, whereby the valve is closed when said closure is open, and an agitating member connecting said closure with said valve, said agitating member being movable in the direction of said opening when the closure is opened.

3. A dispenser adapted to be attached to a mixing machine, consisting of a containing receptacle, a conduit connected with said containing receptacle, and depending therefrom, said conduit having an opening in its side, the lower extremity of said conduit being inclined to said opening, a closure controlling the discharge extremity of said conduit, a valve journaled in said conduit above said opening, a member forming a connection between said closure and said valve, and an agitating member connecting said valve with said closure adapted to move toward said opening by the opening movement of the closure.

In testimony whereof, I affix my signature.

LILLIE MOGENSEN,
*Administratrix of Henry J. Mogensen.*